United States Patent [19]
Lesieur

[11] Patent Number: 5,853,674
[45] Date of Patent: Dec. 29, 1998

[54] COMPACT SELECTIVE OXIDIZER ASSEMBLAGE FOR FUEL CELL POWER PLANT

[75] Inventor: Roger R. Lesieur, Enfield, Conn.

[73] Assignee: International Fuel Cells, LLC, So. Windsor, Conn.

[21] Appl. No.: 584,512

[22] Filed: Jan. 11, 1996

[51] Int. Cl.$^6$ .................................................. F01N 31/10
[52] U.S. Cl. .......................................... 422/173; 48/127.7
[58] Field of Search ............................ 422/173; 48/127.7

[56] References Cited

U.S. PATENT DOCUMENTS

| | | | |
|---|---|---|---|
| 3,847,298 | 11/1974 | Hamilton | 422/173 |
| 3,910,042 | 10/1975 | Yuge et al. | 422/173 |
| 5,270,127 | 12/1993 | Koga et al. | 422/173 |

FOREIGN PATENT DOCUMENTS

| | | |
|---|---|---|
| 03052033 | 3/1989 | European Pat. Off. . |
| 0529329 | 3/1993 | European Pat. Off. . |
| 0618003 | 9/1994 | European Pat. Off. . |
| 0650923 | 5/1995 | European Pat. Off. . |
| 0743694 | 11/1996 | European Pat. Off. . |
| 19539648 | 5/1997 | Germany . |
| 1604980 | 12/1981 | United Kingdom . |
| 9319005 | 9/1993 | WIPO . |
| 9501834 | 1/1995 | WIPO . |

OTHER PUBLICATIONS

Patent Abs of Japan vol. 066, No. 054, Osaka 6AS Co.; Dec. 22, 1981 (BOIJ).

*Primary Examiner*—Timothy McMahon
*Attorney, Agent, or Firm*—William W. Jones

[57] ABSTRACT

A fuel gas selective oxidizer assemblage for use in a fuel cell power plant is formed from a series of repeating components, each of which includes a plurality of separate selective oxidizer gas passages and a plurality of adjacent coolant passages. The selective oxidizer gas and coolant passages are preferably formed by corrugated metal sheets which are interposed between planar metal sheets. One of the planar metal sheets forms a common wall between the selective oxidizer gas passages and the coolant passages so as to provide enhanced heat transfer between the reformate gas in the selective oxidizer gas passages and the coolant. Each of the components includes a first outer planar metal sheet, a medial planar metal sheet, and a second outer planar metal sheet. Each of the planar metal sheets is separated from the next by the corrugated metal gas and coolant passage sheets.

5 Claims, 2 Drawing Sheets

COMPACT SELECTIVE OXIDIZER ASSEMBLAGE FOR FUEL CELL POWER PLANT

TECHNICAL FIELD

This invention relates to a selective oxidizer assemblage which is formed from a plurality of repeating subassemblies. More particularly, this invention relates to a fuel gas selective oxidizer assemblage which is compact and lighter in weight than conventional oxidizer assemblages used in fuel cell power plants.

1. Background Art

Fuel cell power plants include fuel gas selective oxidizers which are operable to remove carbon monoxide from a reformed fuel gas, such as natural gas, which is used as a fuel for fuel cell power plants. The procedure involves passing the reformed fuel gas with small amounts of added gaseous oxygen through a catalytic bed which is capable of oxidizing carbon monoxide in an exothermic reaction. The reaction proceeds at controlled temperatures which are within a given range of about 360° F. to about 170° F. The temperature of the catalyst bed must be maintained above a particular threshold temperature which is between about 220° F. to about 360° F. at the entry stage of the catalyst bed, where the gases being treated are relatively rich in carbon monoxide, and will be reduced to lower temperatures of about 170° F.–220° F. at latter stages of the catalyst bed where the carbon monoxide content of the gas is lower. The catalysts typically used are platinum catalysts which are deposited on alumina granules. U.S. Pat. No. 5,330,727, granted Jul. 19, 1994 to J. C. Trocciola et al discloses a selective oxidizer assemblage which is proposed for use in a fuel cell power plant and describes the temperature regimes required to properly oxidize the carbon monoxide. The type of oxidizer shown in the aforesaid patent is conventionally referred to as a "shell and tube" heat exchanger.

The shell and tube fuel cell power plant selective oxidizers require a large amount of heat transfer surface area between the catalyst bed and the coolant in order to maintain the controlled temperatures needed to produce the degree of carbon monoxide oxidization required to operate the fuel cells properly. This need for large heat transfer surface area, when met by using catalyst-coated granules requires that the catalyst coated granules be diluted, which results in undesirably large and heavy oxidizer assemblies. For example, a 20 KW acid fuel cell power plant that includes a shell and tube oxidizer component requires a volume of about 4 cubic feet for the oxidizer. Higher power fuel cell power plants, such as 200 KW plants or larger, will require proportionally larger fuel gas oxidizers.

It would be highly desirable to provide a fuel oxidizer which is suitable for use in a fuel cell power plant, which oxidizer supplies the necessary catalyzed and coolant surface area, but is compact, strong, and light in weight.

2. Disclosure of the Invention

This invention relates to a selective oxidizer structure which provides the necessary catalyzed surface area, and heat transfer surface area, is substantially smaller and lighter than presently available tube and shell selective oxidizers, and can provide enhanced temperature control throughout the length of the device. The selective oxidizer structure of this invention is formed from a series of essentially flat plate heat exchanger components. Each of the heat exchanger components includes reformed gas passages and adjacent heat exchanger coolant passages. At the entry end of the oxidizer assembly, the reformed fuel gas passages are connected to a fuel gas line which feeds the fuel gas mixture into the oxidizer from the reformer and shift converter assemblies. The opposite exit end of the oxidizer assembly connects to a line that directs the treated fuel gas mixture emanating from the oxidizer assembly to the fuel cell stack in the power plant. The direction of coolant flow can be the same as, counter to, or perpendicular to, the direction of flow of the fuel gas through the device.

The flat plate components of the selective oxidizer assembly may be formed from flat metal sheets which are separated from each other by corrugated metal sheets, or by U-shaped strips, as will be described hereinafter. The corrugated sheets provide the high catalyzed surface area on the gas passage side of the device needed to properly oxidize the carbon monoxide constituent in the fuel gas. The corrugated sheets also provide an extended heat transfer surface for the device. The metal sheets which make up the fuel gas passage components have all of their fuel gas-contacting surfaces coated with a catalyzed alumina layer that is applied to the gas-contacting surfaces by means of a conventional process such as provided by W. R. Grace and Co. The process is presently used to produce automobile catalytic converters, wood stove catalytic emission units, and the like. The metal plates used to form the flat plate components are preferably steel alloy plates containing aluminum which can be brazed or spot welded together; surface oxidized; primed with a wash coat; and finally coated with a catalyst which, when dried, adheres to the wash coated surfaces of the plates. As noted above, only the fuel gas passages in the assembly are catalyzed. The use of a series of separate passages in each fuel gas flow section in the oxidizer provides the necessary catalyzed surface area. Heat transfer from the stream of fuel gas being oxidized is more readily controlled by essentially pairing each gas passage in the device with its own coolant passage, with the paired gas and coolant passages sharing a common wall. Thus, the use of the flat plate construction enables more accurate control of the operating temperatures of the oxidizer. The benefits of the sandwiched plate construction of this invention are possible because this construction can provide up to five hundred square feet of heat exchange surface per cubic foot of volume with the catalyst in intimate contact with the heat exchange surface of the device. Using the design of this invention, a selective oxidizer for use with a 20 KW power plant can be formed using only 0.1 cubic foot of space.

It is therefore an object of this invention to provide an improved selective oxidizer assembly for use in a fuel cell power plant, which oxidizer assembly is compact and lightweight.

It is a further object of this invention to provide an oxidizer assembly of the character described which operates at more accurately controlled temperatures than presently available oxidizer assemblies.

It is another object of this invention to provide an oxidizer assembly of the character described which is inexpensive to manufacture as compared to commercially available fuel cell power plant fuel gas selective oxidizers.

These and other objects and advantages of this invention will become readily apparent to one skilled in the art from the following detailed description of a preferred embodiment of the invention when taken in conjunction with the accompanying drawings in which:

BEST MODE FOR CARRYING OUT THIS INVENTION

Figure 1:
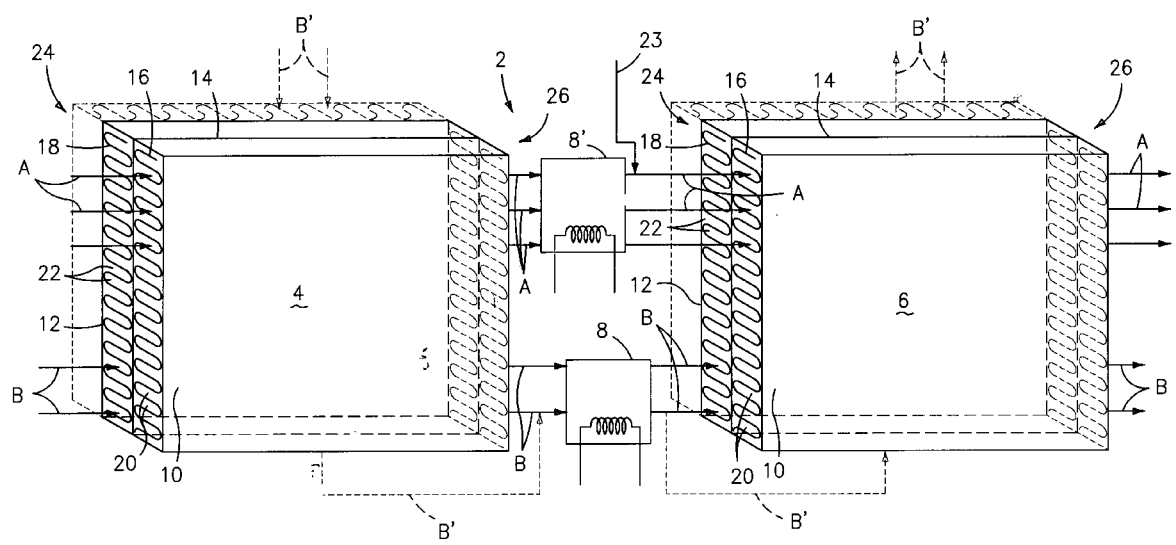
FIG. 1 is a schematic view of a first embodiment of a selective oxidizer assembly formed in accordance with this invention.

Referring now to the drawings, there is shown in FIG. 1 a schematic view of a first embodiment of a fuel gas selective oxidizer assembly formed in accordance with this invention. The selective oxidizer assembly is denoted generally by the numeral 2 and includes a pair of spaced-apart heat exchange zones 4 and 6, with a coolant heat exchanger 8 interposed between the two zones 4 and 6. The oxidizer assembly 2 is formed from parallel outer planar wall members 10 and 12 sandwiched around, and spaced-apart from a medial planar wall member 14. The wall members 10, 12 and 14 are separated from each other by corrugated core sheets 16 and 18. The planar sheets 10 and 14 combine with the corrugated sheet 16 to form a plurality of gas flow passages 20 through which the reformer gas-oxygen mixture flows. The planar sheets 12 and 14 combine with the corrugated sheet 18 to form a plurality of coolant flow passages 22.

It will be noted that each of the gas flow passages 20 is paired with a respective coolant flow passage 22, and that the passages 20 and 22 share a common wall, i.e., the planar sheet 14. The embodiment shown in FIG. 1 is an embodiment of the invention which employs unidirectional flow of both the coolant stream and the reformer gas-oxygen mixture stream. That is to say, the fuel gas-oxygen mixture stream flows in the direction indicated by arrows A, and the coolant stream flows in the same direction, as indicated by arrows B. The ends of the assembly 2 denoted by the numeral 24 can be characterized as inlet ends for the assembly zones 4 and 6; and the ends of zones 4 and 6 of the assembly denoted by the numeral 26 can be characterized as outlet ends of the assembly. It will be understood that the gas mixture entering the passages 20 at the inlet ends 24 of the zones 4 and 6 of the assembly 2 comes from the fuel gas reformer and shift converter components of the power plant, and the gas mixture leaving the passages 20 from the zone 6 is piped to the active area of the power plant cell stack.

Figure 3:
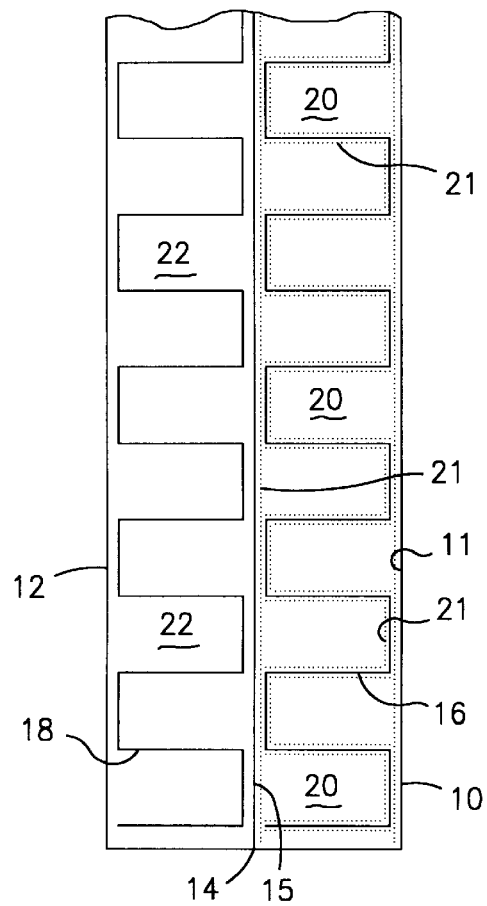
FIG. 3 is an end view of a selective oxidizer assembly formed in accordance with this invention showing the manner of construction of the gas and coolant passages.

The assembly 2 operates as follows. Referring briefly to FIG. 3, the walls 11 and 15 of the plates 10 and 14 respectively, as well as the surfaces of the corrugated sheet 16 which form the sides of the gas passages 20 in the zones 4 and 6, are provided with a platinum catalyst coating 21 which is capable of selectively oxidizing carbon monoxide (CO) in the reformer fuel gas-oxygen mixture. The fuel gas-oxygen mixture, which may contain as much as 1.0% (10,000 ppm) CO enters the inlet end 24 (shown in FIG. 1) of the fuel passages 20 at temperatures which are typically in the range of about 220° F. to about 360° F. The coolant stream enters the inlet end 24 (shown in FIG. 1) of the coolant passages 22 at temperatures in the range of about 180° F. to about 360° F. It is important to maintain the fuel gas mixture at a temperature of not less than about 220° F. at the inlet end 24 of the assemblage 2 so as to ensure that the catalyst in the fuel gas mixture flow passages 20 is not rendered ineffective by the relatively large percentage of CO in the gas mixture as it enters the oxidizer zone 4. The threshold temperature for catalyst degradation is 220° F., however if the temperature increases to greater than about 360° F. to about 380° F., the catalyst loses its selectivity, and the hydrogen in the reformed gas stream will be burned, in lieu of the CO in the gas stream. The high heat transfer provided by this assemblage with its increased catalyzed surfaces, and the heat transfer fluid (either gas or liquid), maintains the reactant stream at an optimum temperature, even when there is a large quantity of heat generated from oxidation of CO in the gas stream. The coolant and gas streams both exit the first zone 4 of the assemblage at a temperature in the range of about 220° F. to about 380° F.

At this point, the CO content of the reformer gas stream is typically in the range of about 300–500 ppm. The coolant stream passes through the coolant heat exchanger 8 where the temperature of the coolant stream is lowered to about 170° F. The 170° F. coolant stream enters the coolant passages 22 at the entrance end 24 of the second zone 6 of the assemblage 2, while at the same time the fuel gas stream is cooled, if necessary, to a temperature in the range of about 170° F. to about 220° F. in a fuel gas heat exchanger 8'. Additional oxygen may be added to the fuel gas line via line 23. The re-oxygenated fuel gas then enters the gas stream passages 22 at the entrance end 24 of the second zone 6 of the assemblage 2. Flowing through the second zone 6 of the assemblage 2, the temperature of the reformer gas stream will be lowered to about 180° F., and the CO content of the reformer gas stream will be lowered to less than about 10 ppm. The reformer gas stream which exits the end 26 of the assemblage zone 6 will thus have a temperature of about 180° F. and a CO content of less than about 10 ppm. As shown in phantom lines in FIG. 1, the coolant and fuel gas streams can be made to flow in cross directions as noted by the arrows A and B'.

Figure 2:
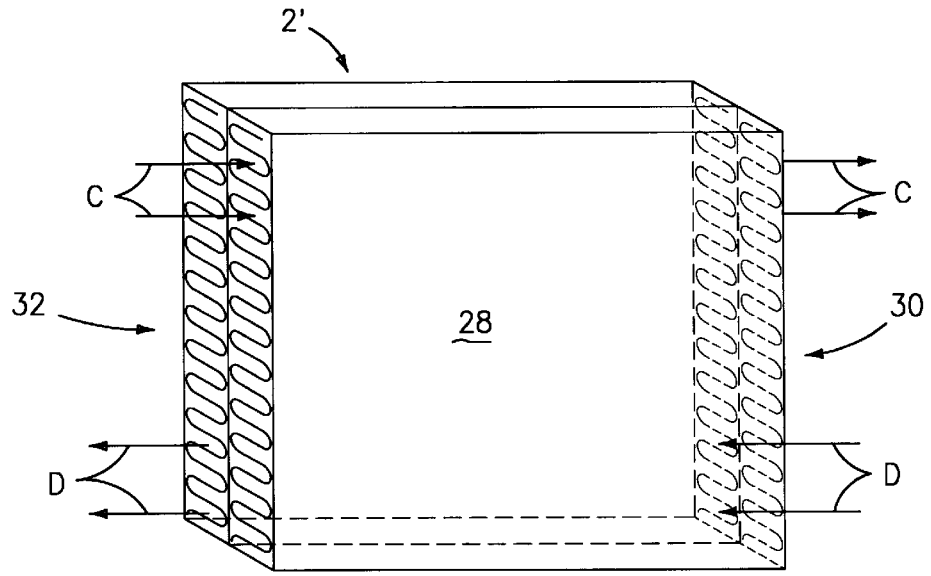
FIG. 2 is a schematic view similar to FIG. 1 of a second embodiment of a selective oxidizer assembly formed in accordance with this invention.

FIG. 2 is a schematic view of a second embodiment of a selective oxidizer which is formed in accordance with this invention. The assemblage shown in FIG. 2 is denoted generally by the numeral 2' and includes a housing 28 formed from the flat plate components as described above. The coolant stream flows through the housing 28 in the direction of the arrows D and the fuel gas-oxygen mixture stream flows through the housing 28 in the direction of the arrows C. The coolant enters the end 30 of the housing 28 at a temperature which is less than about 220° F., and preferably in the range of about 150° F. to about 170° F. The fuel gas-oxygen mixture stream enters the end 32 of the housing 28 at a temperature in the range of about 220° F. to about 360° F. The fuel gas stream exits the end 30 of the housing 28 at a temperature in the range of about 180° F. to about 220° F., and the coolant stream exits the end 32 of the housing 28 at a temperature in the range of about 220° F. to about 360° F.

The use of the plate construction with outer planar parts and inner separate passages results in a lightweight, strong oxidizer assembly which provides a large surface area per unit volume. The entire surface of the fuel gas flow passages in the oxidizer heat exchanger assembly can be catalyzed by wash coating and selectively applying the catalyst to the fuel gas flow passages in the assembled structure. The fact that the gas flow and coolant flow sections of the assembly form extensive heat exchange surfaces allows the assembly to be operated at more accurately controlled temperatures than the currently available shell and tube catalyzed pellet-type oxidizers. The gas and coolant passages have been shown in the drawings as being formed from one or more corrugated sheets, however, separate U-shaped strips could also be used instead. The weight and size savings achieved by using the plate-type construction described above is enhanced with larger higher power output fuel cell power plants.

Since many changes and variations of the disclosed embodiment of the invention may be made without departing from the inventive concept, it is not intended to limit the invention other than as required by the appended claims.

What is claimed is:

1. A selective oxidizer assembly for reducing carbon monoxide in a stream of a fuel gas and oxygen mixture to a concentration which is less than about ten parts per million without significantly decreasing the hydrogen content of the fuel gas, so as to condition said fuel gas for use in a fuel cell power plant, said oxidizer assembly comprising:

a) a fuel gas inlet line for directing a mixture of the fuel gas and oxygen into said assembly, said inlet line leading to a gas flow section in said assembly for receiving a stream of the fuel gas and oxygen mixture, said gas flow section being formed from first and second spaced-apart plates with a plurality of separate catalyst-coated gas passages sandwiched between said first and second plates;

b) a coolant inlet line for directing a coolant into said assembly, said coolant inlet line leading to a coolant section in said assembly, said coolant section being adjacent to said gas flow section and said coolant section being formed from said first plate and a third plate which is spaced-apart from said first plate on a side thereof opposite said second plate, said coolant section further including a plurality of coolant passages sandwiched between said first and third plates, said first plate providing heat transfer from gas flowing through said gas passages to coolant flowing through said coolant passages, said coolant being maintained at an inlet temperature which is less than about 220° F. and at an outlet temperature which is less than about 360° F. whereby said fuel gas and oxygen mixture is cooled within the assembly from an inlet temperature of about 360° F. to an outlet temperature of about 170° F.

2. The oxidizer assembly of claim 1 wherein said assembly includes two adjacent zones whereby the selective oxidation of carbon monoxide in the fuel gas stream is performed stepwise in a first zone and in a second zone, said assembly comprising a heat exchanger interposed between said first and second zones and means for directing the coolant through said heat exchanger so as to lower the temperature of first zone outlet coolant stream prior to the coolant stream entering said second zone.

3. The oxidizer assembly of claim 2 wherein said coolant is maintained at a first zone coolant inlet temperature which is less than about 220° F. and at a first zone coolant outlet temperature which is less than about 360° F. whereby said fuel gas and oxygen mixture is cooled to a first zone outlet temperature of about 220° F., and said heat exchanger is operable to cool a coolant stream flowing from said first zone to said second zone to a second zone inlet temperature of less than about 220° F.

4. The oxidizer assembly of claim 3 wherein said coolant stream is operable to lower the temperature of said fuel gas and oxygen mixture in said second zone to a second zone outlet temperature of about 180° F.

5. The oxidizer assembly of claim 2 further comprising a line between said first zone and said second zone for admitting oxygen into the fuel gas and oxygen mixture.

* * * * *